(12) United States Patent
Elshafie et al.

(10) Patent No.: US 12,191,991 B2
(45) Date of Patent: Jan. 7, 2025

(54) SELF-DECODABLE DATA PORTION FOR PHYSICAL UPLINK REPETITION

(71) Applicant: QUALCOMM Incorporated, San Diego, CA (US)

(72) Inventors: Ahmed Elshafie, San Diego, CA (US); Yi Huang, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 17/647,254

(22) Filed: Jan. 6, 2022

(65) Prior Publication Data

US 2023/0216605 A1 Jul. 6, 2023

(51) Int. Cl.
*H04L 1/00* (2006.01)
*H04L 1/18* (2023.01)
*H04L 5/00* (2006.01)

(52) U.S. Cl.
CPC .............. *H04L 1/0013* (2013.01); *H04L 1/18* (2013.01); *H04L 5/0048* (2013.01); *H04L 5/0055* (2013.01)

(58) Field of Classification Search
CPC ....... H04L 1/0013; H04L 1/18; H04L 5/0048; H04L 5/0055; H04L 1/08; H04L 1/1819; H04L 1/189; H04L 1/1896

USPC .................................................. 714/752, 776
See application file for complete search history.

(56) References Cited

U.S. PATENT DOCUMENTS

| | | | |
|---|---|---|---|
| 2019/0288800 A1* | 9/2019 | Hosseini | H04L 1/189 |
| 2019/0327064 A1* | 10/2019 | Hosseini | H04L 1/1896 |
| 2020/0136770 A1* | 4/2020 | Khoshnevisan | H04L 1/08 |
| 2020/0145964 A1* | 5/2020 | Sengupta | H04L 1/0031 |
| 2020/0313793 A1* | 10/2020 | Jung | H04L 5/0094 |
| 2020/0314875 A1* | 10/2020 | Fakoorian | H04W 72/1263 |
| 2021/0014002 A1* | 1/2021 | Lovlekar | H04W 72/20 |
| 2021/0021390 A1* | 1/2021 | Zhao | H04W 28/18 |
| 2021/0274493 A1* | 9/2021 | Papasakellariou | H04L 5/0053 |
| 2022/0045792 A1* | 2/2022 | Song | H04L 1/08 |
| 2022/0077963 A1* | 3/2022 | Salim | H04W 72/04 |
| 2023/0216605 A1* | 7/2023 | Elshafie | H04L 1/0013 714/726 |

* cited by examiner

*Primary Examiner* — Albert Decady
*Assistant Examiner* — Osman M Alshack
(74) *Attorney, Agent, or Firm* — Guang Y. Zhang; Harrity & Harrity, LLP

(57) ABSTRACT

Various aspects of the present disclosure generally relate to wireless communication. In some aspects, a user equipment (UE) may receive an indication associated with Type B physical uplink channel repetitions of a transport block. The UE may transmit the repetitions of the transport block, including a first smaller repetition of the repetitions that has a first payload size that is smaller than a nominal payload size for the repetitions and that includes a first self-decodable data portion of the transport block. Numerous other aspects are described.

30 Claims, 10 Drawing Sheets

SELF-DECODABLE DATA PORTION FOR PHYSICAL UPLINK REPETITION

FIELD OF THE DISCLOSURE

Aspects of the present disclosure generally relate to wireless communication and to techniques and apparatuses for transmitting self-decodable data portions of a transport block in physical uplink repetitions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving an indication associated with Type B physical uplink channel repetitions of a transport block. The method may include transmitting the repetitions of the transport block, including a first smaller repetition of the repetitions that has a first payload size that is smaller than a nominal payload size for the repetitions and that includes a first self-decodable data portion of the transport block.

Some aspects described herein relate to a method of wireless communication performed by a base station. The method may include transmitting, to a UE, an indication associated with Type B physical uplink channel repetitions of a transport block. The method may include receiving, from the UE in connection with transmitting the indication, the repetitions of the transport block, including a first smaller repetition of the repetitions that has a first payload size that is smaller than a nominal payload size for the repetitions and that includes a first self-decodable data portion of the transport block.

Some aspects described herein relate to a UE for wireless communication. The UE may include a memory and one or more processors coupled to the memory. The one or more processors may be configured to receive an indication associated with Type B physical uplink channel repetitions of a transport block. The one or more processors may be configured to transmit the repetitions of the transport block, including a first smaller repetition of the repetitions that has a first payload size that is smaller than a nominal payload size for the repetitions and that includes a first self-decodable data portion of the transport block.

Some aspects described herein relate to a base station for wireless communication. The base station may include a memory and one or more processors coupled to the memory. The one or more processors may be configured to transmit, to a UE, an indication associated with Type B physical uplink channel repetitions of a transport block. The one or more processors may be configured to receive, from the UE in connection with transmitting the indication, the repetitions of the transport block, including a first smaller repetition of the repetitions that has a first payload size that is smaller than a nominal payload size for the repetitions and that includes a first self-decodable data portion of the transport block.

Some aspects described herein relate to a non-transitory computer-readable medium that stores a set of instructions for wireless communication by a UE. The set of instructions, when executed by one or more processors of the UE, may cause the UE to receive an indication associated with Type B physical uplink channel repetitions of a transport block. The set of instructions, when executed by one or more processors of the UE, may cause the UE to transmit the repetitions of the transport block, including a first smaller repetition of the repetitions that has a first payload size that is smaller than a nominal payload size for the repetitions and that includes a first self-decodable data portion of the transport block.

Some aspects described herein relate to a non-transitory computer-readable medium that stores a set of instructions for wireless communication by a base station. The set of instructions, when executed by one or more processors of the base station, may cause the base station to transmit, to a UE, an indication associated with Type B physical uplink channel repetitions of a transport block. The set of instructions, when executed by one or more processors of the base station, may cause the base station to receive, from the UE in connection with transmitting the indication, the repetitions of the transport block, including a first smaller repetition of the repetitions that has a first payload size that is smaller than a nominal payload size for the repetitions and that includes a first self-decodable data portion of the transport block.

Some aspects described herein relate to an apparatus for wireless communication. The apparatus may include means for receiving an indication associated with Type B physical uplink channel repetitions of a transport block. The apparatus may include means for transmitting the repetitions of the transport block, including a first smaller repetition of the repetitions that has a first payload size that is smaller than a nominal payload size for the repetitions and that includes a first self-decodable data portion of the transport block.

Some aspects described herein relate to an apparatus for wireless communication. The apparatus may include means for transmitting, to a UE, an indication associated with Type B physical uplink channel repetitions of a transport block. The apparatus may include means for receiving, from the UE in connection with transmitting the indication, the repetitions of the transport block, including a first smaller repetition of the repetitions that has a first payload size that is smaller than a nominal payload size for the repetitions and that includes a first self-decodable data portion of the transport block.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
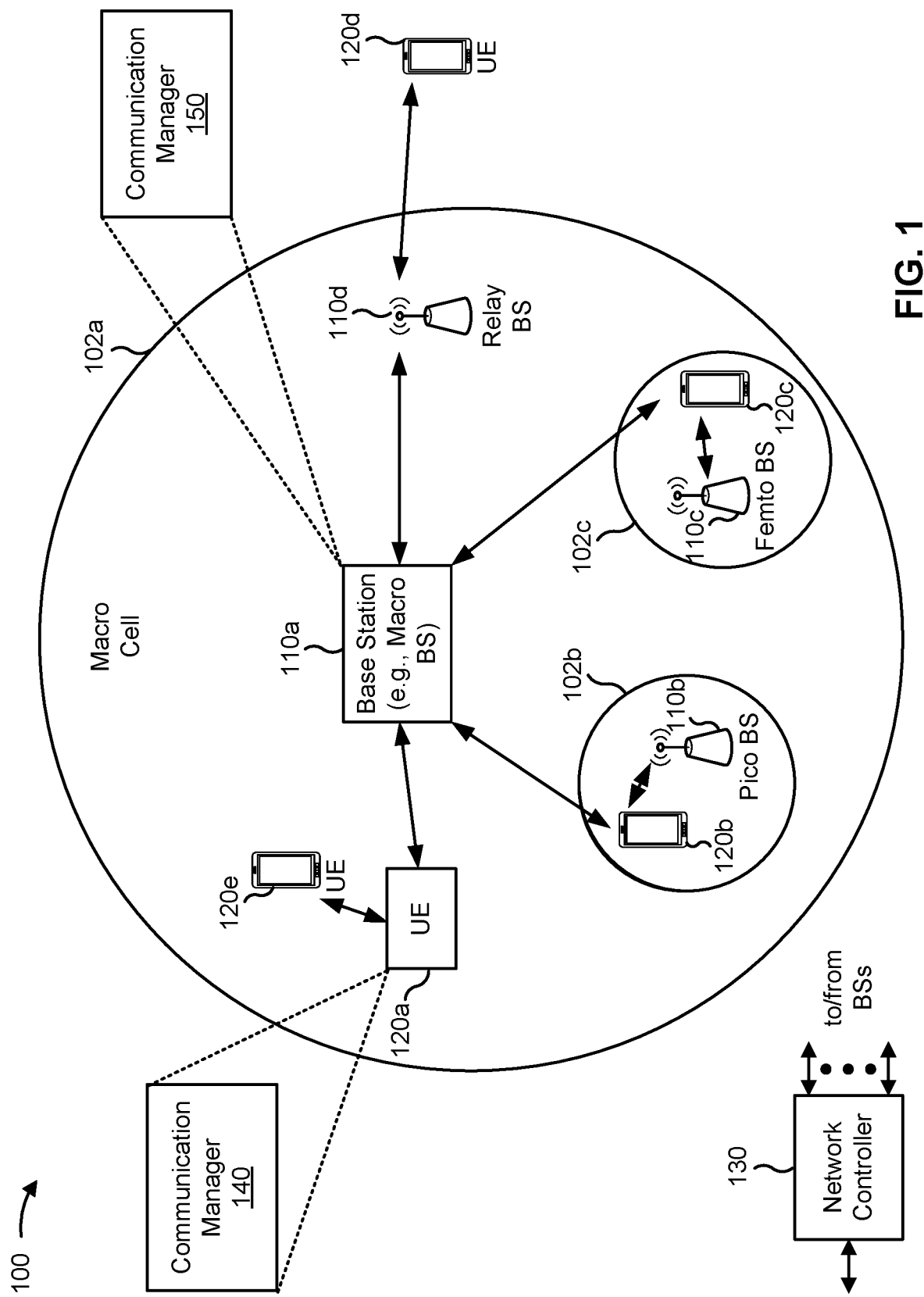
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive an indication associated with Type B physical uplink channel repetitions of a transport block. The physical uplink channel repetitions may include physical uplink control channel (PUCCH) repetitions and/or physical uplink shared channel (PUSCH) repetitions. The communication manager 140 may transmit the repetitions of the transport block, including a first smaller repetition of the repetitions that has a first payload size that is smaller than a nominal payload size for the repetitions and that includes a first self-decodable data portion of the transport block. Additionally, or alternatively, the communication manager 140 may perform one or more other operations described herein.

In some aspects, the base station 110 may include a communication manager 150. As described in more detail elsewhere herein, the communication manager 150 may transmit, to a UE, an indication associated with Type B physical uplink channel repetitions of a transport block. The communication manager 150 may receive, from the UE in connection with transmitting the indication, the repetitions of the transport block, including a first smaller repetition of the repetitions that has a first payload size that is smaller than a nominal payload size for the repetitions and that includes a first self-decodable data portion of the transport block. Additionally, or alternatively, the communication manager 150 may perform one or more other operations described herein.

As indicated above, FIG. 1 is provided as an example. Other examples may differ from what is described with regard to FIG. 1.

Figure 2:
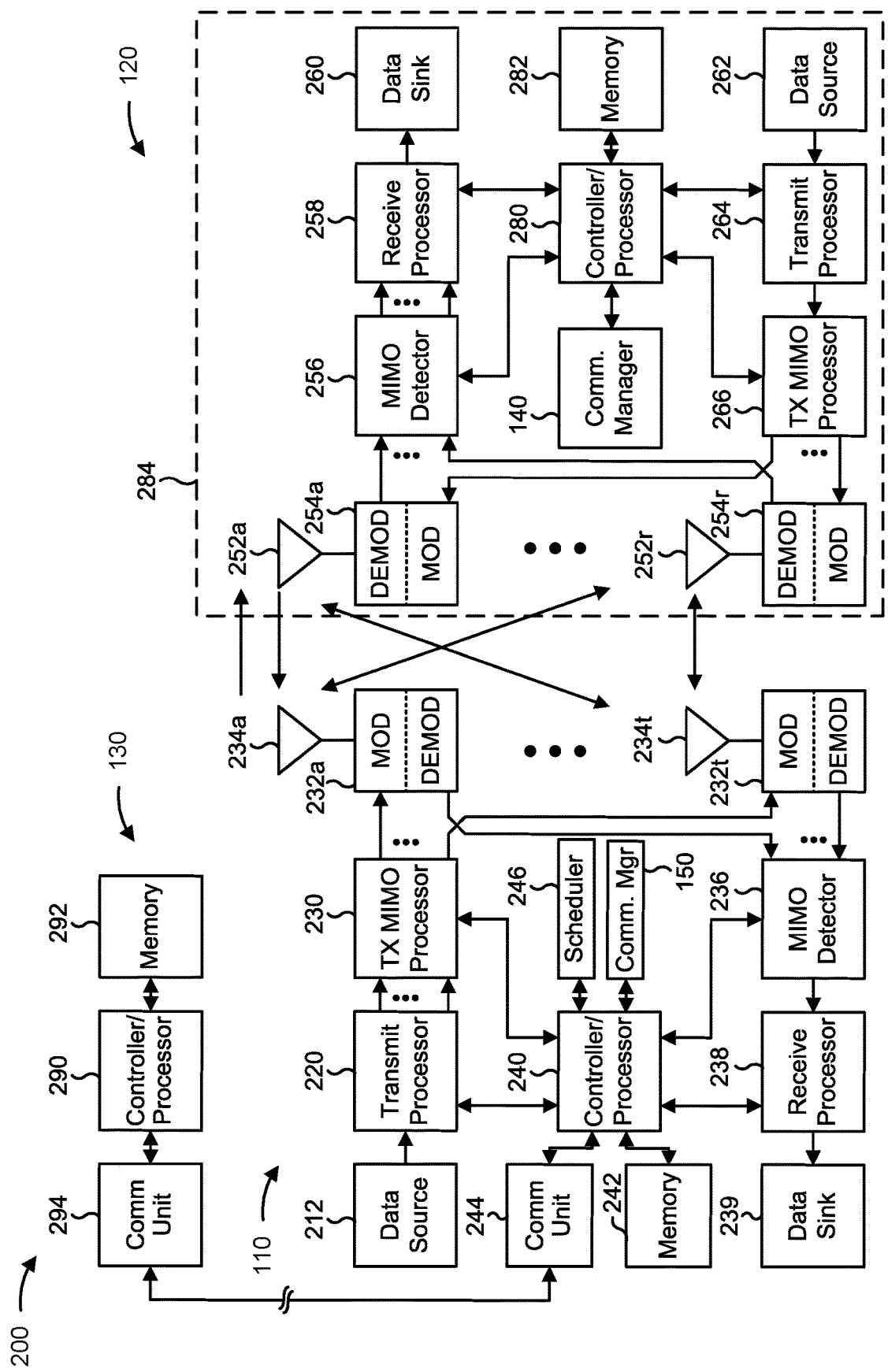
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., 7 modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, May provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-10).

The controller/processor 240 of the base station 110, the controller/processor 280 of the UE 120, and/or any other component(s) of FIG. 2 may perform one or more techniques associated with transmitting self-decodable data portions of a transport block in physical uplink repetitions (e.g., PUCCH repetitions, PUSCH repetitions), as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a UE (e.g., a UE 120) includes means for receiving an indication associated with Type B physical uplink channel repetitions of a transport block; and/or means for transmitting the repetitions of the transport block, including a first smaller repetition of the repetitions that has a first payload size that is smaller than a nominal payload size for the repetitions and that includes a first self-decodable data portion of the transport block. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station (e.g., base station 110) includes means for transmitting, to a UE, an indication associated with Type B physical uplink channel repetitions of a transport block; and/or means for receiving, from the UE in connection with transmitting the indication, the repetitions of the transport block, including a first smaller repetition of the repetitions that has a first payload size that is smaller than a nominal payload size for the repetitions and that includes a first self-decodable data portion of the transport block. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
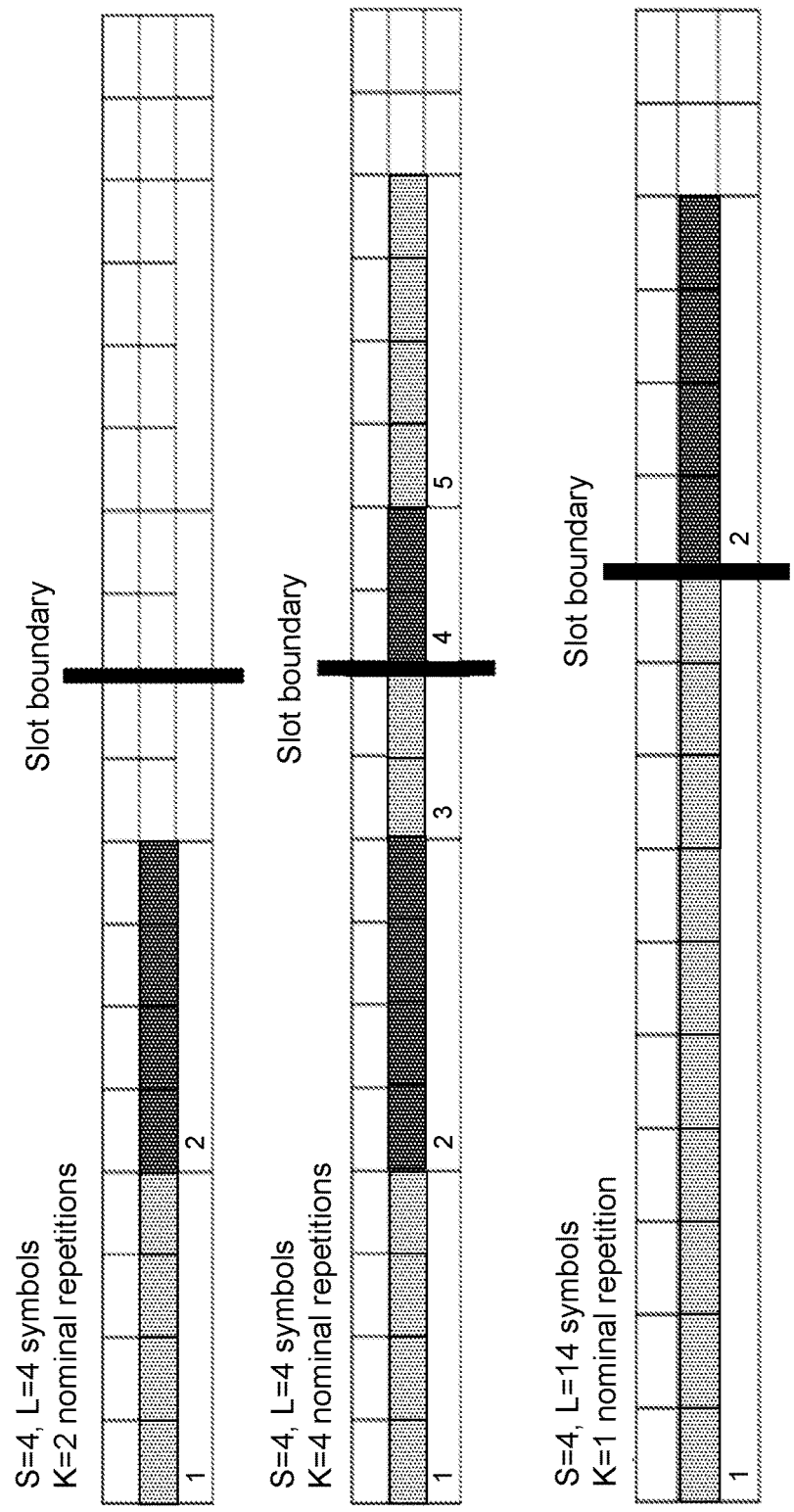
FIG. 3 is a diagram illustrating an example of physical uplink control channel (PUCCH) repetitions, in accordance with the present disclosure.

FIG. 3 is a diagram illustrating an example 300 of PUCCH repetitions, in accordance with the present disclosure.

A UE may repeat the same message (e.g., transport block) a certain quantity of times on a physical uplink channel, such as a PUCCH, to improve reliability. Each PUCCH repetition may have the same length (e.g., in symbols). For example, a first repetition and a second repetition, up to repetition K, may all have the same length. Each repetition may have N DMRS symbols and M uplink control information (UCI) symbols. M and N may be identical across all repetitions.

In some aspects, PUCCH repetitions may have different lengths. This may be a result of slot boundaries. Example 300 shows three groups of repetitions: a top group, a middle group, and a bottom group. The top group shows two repetitions, where a first repetition has a length L of 4 symbols and a second repetition has a length S of 4 symbols. The first slot has a quantity K of 2 repetitions. K may be the quantity of nominal repetitions and the nominal repetitions may split into multiple actual repetitions. The middle group has two repetitions of 4 symbols each, but due to a slot boundary, the slot has a third repetition of 2 symbols. The next slot has a fourth repetition of 2 symbols and a fifth repetition of 4 symbols. The bottom group has one long repetition of 14 symbols that fills up the first slot. The second slot starts with a repetition of 4 symbols. In other words, because of slot boundaries, repetitions may be of different lengths.

As indicated above, FIG. 3 is provided as an example. Other examples may differ from what is described with regard to FIG. 3.

Figure 4:
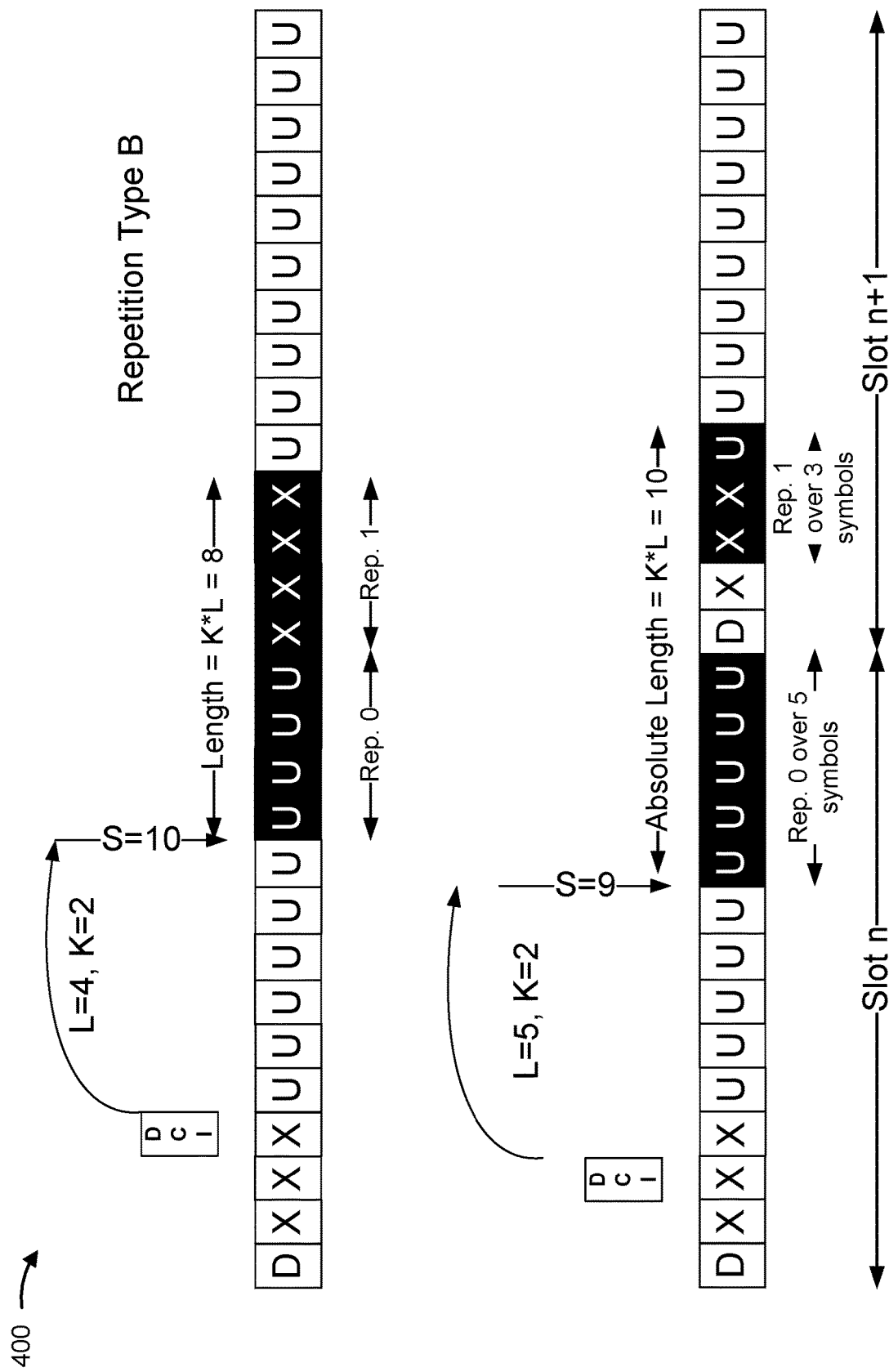
FIG. 4 is a diagram illustrating an example of PUCCH repetitions, in accordance with the present disclosure.

FIG. 4 is a diagram illustrating an example 400 of PUCCH repetitions, in accordance with the present disclosure.

PUCCH repetitions (or PUSCH repetitions) may be of Type A or Type B. Type A repetitions may start regularly after a specified quantity of symbols and may not span across a slot boundary. Type B repetitions may be within or across slots, may cross a slot boundary, and may dynamically change a quantity of repetitions. The top portion of example 400 shows Type B repetitions with K nominal repetitions, each with nominal length L, that may be sent back-to-back starting from symbol S, where S and L are given by a start and length indicator value (SLIV).

In some aspects, PUCCH repetitions may be of different lengths because of segmentation around a slot border. The bottom portion of example 400 shows downlink control information (DCI) that indicates a quantity K of two repetitions, each being a length L of 5 symbols, for an absolute length of 10 symbols for both repetitions. The first repetition is to begin after 9 symbols.

Example 400 shows that the first repetition for the PUCCH is 5 uplink (U) symbols, but a next symbol is a downlink (D) symbol from the base station. The downlink symbol is followed by a gap symbol (X), and the downlink and gap symbols break up the two PUCCH repetitions. The second repetition is only 3 symbols, which is a different length than the first repetition. The different length repetitions may be of a PUCCH repetition Type B format (similar to a PUSCH Type B format).

In some scenarios, while a nominal repetition may be, for example, 5 symbols, the actual repetitions could be very small, such as 2 symbols. These smaller actual repetitions may fill payloads with as much data of a transport block as possible but may not be self-decoding (or have no coding gain) when symbol puncturing is high. Self-decodable data includes data that can be decoded from a repetition without being combined with additional information or data from another repetition. If data in a smaller repetition is not self-decodable, the data may be useless and signaling resources may be wasted. Furthermore, if a payload pattern of a repetition repeats for smaller repetitions, such as a DMRS first symbol and data in the next symbols, less data would be transmitted in the second symbol due to the repeat of the DMRS in the first symbol.

Furthermore, a receiving UE (or a receiving base station) may use DMRSs in each transport block for channel estimation, where channel estimation is performed for each time instance (e.g., slot), separately. If channel estimation is performed with DMRSs of multiple transport blocks together, the accuracy of the channel estimation may be improved because the estimates involve information across multiple slots. This may be referred to as "cross-slot channel estimation," "DMRS bundling," or "joint channel estimation." With smaller actual repetitions, the UE may be unable to perform DMRS bundling across PUCCH transmissions. Less accurate channel estimation may cause the UE to waste processing resources and signaling resources.

As indicated above, FIG. 4 is provided as an example. Other examples may differ from what is described with regard to FIG. 4.

Figure 5:
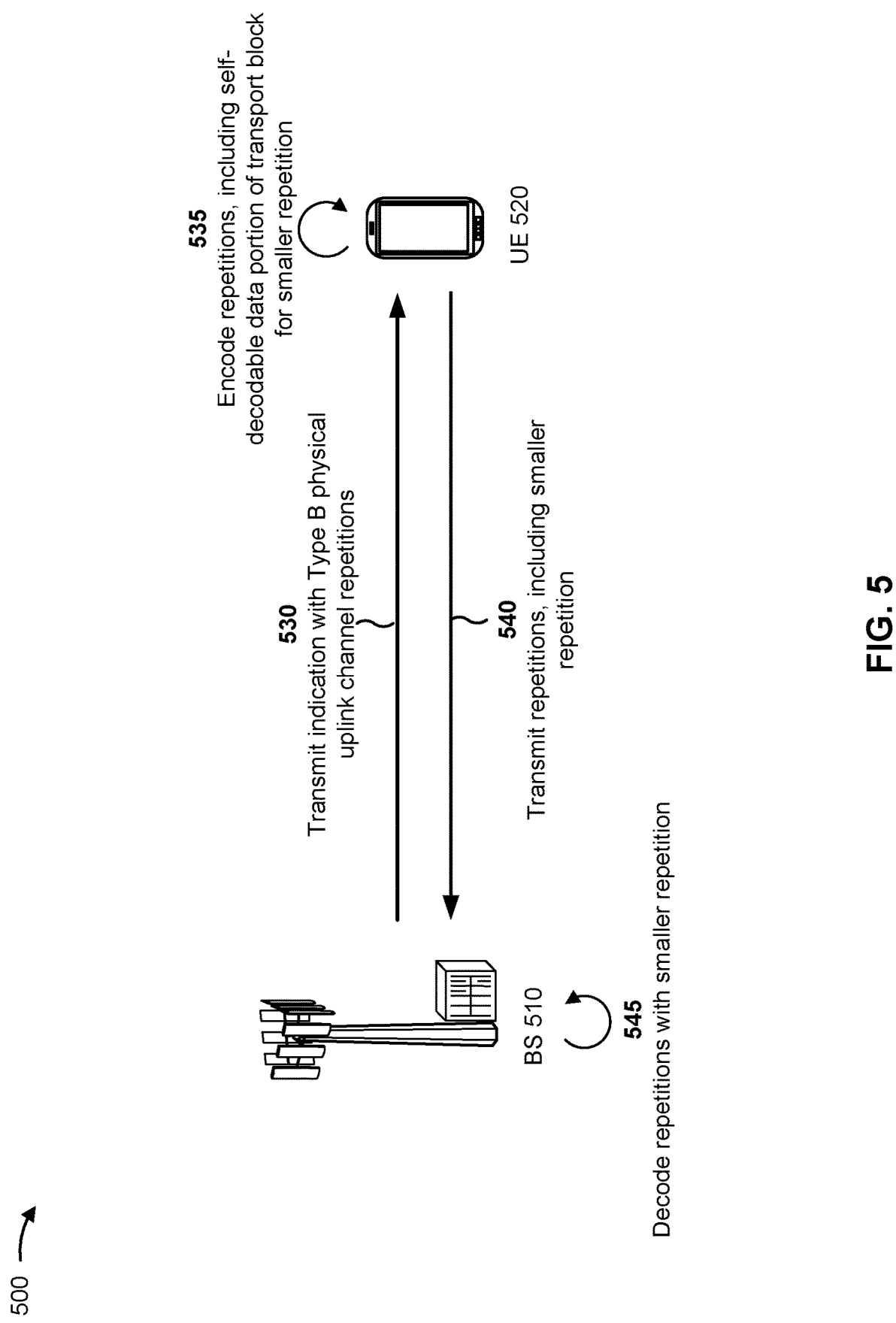
FIG. 5 is a diagram illustrating an example of using smaller repetitions with self-decodable portions, in accordance with the present disclosure.

FIG. 5 is a diagram illustrating an example 500 of using smaller repetitions with self-decodable portions, in accordance with the present disclosure. As shown in FIG. 5, example 500 includes communication between BS 510 (e.g., a BS 110 depicted in FIGS. 1 and 2) and a UE 520 (e.g., a UE 120 depicted in FIGS. 1 and 2). In some aspects, BS 510 and UE 520 may be included in a wireless network, such as wireless network 100. BS 510 and UE 520 may communicate on a wireless access link, which may include an uplink and a downlink.

A UE may transmit PUCCH or PUSCH repetitions, including Type B repetitions. Each of the repetitions may have a nominal payload size, or a size that provides for transmission of all of the data of a transport block. However, in some scenarios, a repetition may be segmented due to a slot boundary or puncturing of symbols (symbols changed from uplink to downlink). This may result in an actual repetition with a payload that is smaller than a nominal payload size. As mentioned above, the data in smaller payloads may not be self-decoding, and if data in a smaller payload is not self-decodable, the data may be useless and signaling resources may be wasted. Furthermore, smaller payloads may include a DMRS in a first symbol and data in the next symbols. Therefore, there would be less room for data in smaller payloads due to the repeat of the DMRS in the first symbol of each smaller repetition.

According to various aspects described herein, a UE may use a smaller data portion of the transport block in the payload of the smaller actual repetition such that the smaller data portion is self-decodable (independently decodable). By using a smaller self-decodable data portion in a smaller repetition, the UE may increase the accuracy or reliability of the bits in the self-decodable portion, which may become known bits for decoding other repetitions. As a result, rather than wasting the smaller repetition, the smaller repetition may be used to increase the reliability of the repetitions, which helps the UE conserve processing resources and signaling resources. If the self-decodable portion is repeated in multiple independently codable repetitions, the reliability (i.e., decoding error) of the self-decodable portion may increase, and this higher repetition coding may increase the accuracy of the decoded transport block. Channel estimation with DMRS bundling may also be more accurate.

As shown by reference number 530, BS 510 may transmit an indication associated with Type B physical uplink channel (e.g., PUCCH, PUSCH) repetitions of a transport block. The indication may include DCI that indicates a type of repetition, a starting symbol for repetitions, a quantity of repetitions, and/or a pattern of repetitions. The indication may indicate that UE 520 is to include a self-decodable data portion of the transport block for a smaller repetition.

As shown by reference number 535, UE 520 may encode repetitions for the transport block, including a self-decodable data portion for a smaller repetition. UE 520 may determine what portion (less than total amount) of the transport block to include in the data portion of a smaller repetition such that the data portion is self-decodable (e.g., with high repetition coding).

In some aspects, the indication from BS 510 may indicate a size of the self-decodable data portion. For example, the indication may include a percentage of data bits of the transport block that are to be included in the self-decodable data portion of a smaller repetition. UE 520 may apply the percentage before encoding of the data bits for a repetition. UE 520 may apply the percentage as a ceiling of a specified percentage or as a floor of the specified percentage.

In some aspects, BS 510 may configure UE 520 (e.g., via a radio resource control (RRC) message or a medium access control control element (MAC CE)) with a table that may be used to store configuration information by UE 520 to determine a quantity of bits to transmit for a smaller repetition. For example, the table may have entries, where each entry includes a quantity of symbols and a corresponding quantity of bits for a given payload size (e.g., time-domain size). UE 520 may use the indication, the table, a rule, or other stored configuration information to generate the self-decodable data portion for a smaller repetition, among other repetitions for the transport block, that is encoded by UE 520.

As shown by reference number 540, UE 520 may transmit the repetitions, including the smaller repetition. As shown by reference number 545, BS 510 may decode the repetitions, including the smaller repetition. Data bits decoded for the smaller repetition may be used for decoding the other repetitions (having passed a cyclic redundancy check (CRC)). For example, the data bits of the self-decodable data portion of the smaller repetition may be more reliable and may be used as known bits for the other repetitions. This may result in an improvement of the decoding of the repetitions with the nominal payload size. The known bits may be specified with infinite log likelihood ratios (LLRs), similar to frozen bits.

In some aspects, a first repetition may be a full payload transmission, and a second repetition or further repetitions may be a smaller repetition based at least in part on a quantity of symbols. That is, at least one repetition of the repetitions may be a full repetition (nominal size payload). The full repetition may be transmitted before a smaller repetition.

In some aspects, the payloads of multiple smaller repetitions may combine to equal a full repetition with the nominal payload size for a transport block. For example, two repetitions, such as repetitions 3 and 4 in FIG. 3, may be smaller repetitions. The smaller repetitions may each have self-decodable smaller portions of the transport block. UE 520 may split the data of the transport block into the two repetitions, with a first payload size for the first smaller repetition being X1 and a second payload size for the second smaller repetition being X2. A sum of X1 and X2 may equal the nominal payload size X for a full repetition. The payloads may include UCI bits. If there are three or more smaller repetitions, the sum may be represented as X1+X2+X3 . . . =X. UE 520 may then encode each smaller repetition based at least in part on available symbols (and available data tones or resource elements (REs)).

If the sum of the payload sizes (e.g., available symbols, data tones, REs) of the smaller repetitions is the same as the nominal payload size, then the entire payload for the transport block may be transmitted in the smaller repetitions. However, if a sum of the payload sizes of the smaller repetitions is less than the nominal payload size, then UE 520 may distribute the transport block among the smaller repetitions to maximize the payloads of the smaller repetitions. For example, UE 520 may compute the payload for each actual repetition based at least in part on the available quantity of symbols for a respective repetition, except that the last repetition may be assigned the remaining bits independently of the quantity of available symbols in the last repetition. If there is no last repetition to be used due to the symbols being punctured (e.g., for downlink symbols or flexible symbols), then the last repetition may not include any data portion of the transport block.

Alternatively, in some aspects, if the sum of the payload sizes of the smaller repetitions is less than the nominal payload size for the transport block, UE 520 may divide the nominal payload size over the quantity of the smaller repetitions and use the calculated result as the quantity of bits to be transmitted on each smaller repetition independently of the quantity of available symbols for each smaller repetition.

As indicated above, FIG. 5 is provided as an example. Other examples may differ from what is described with regard to FIG. 5.

Figure 6:
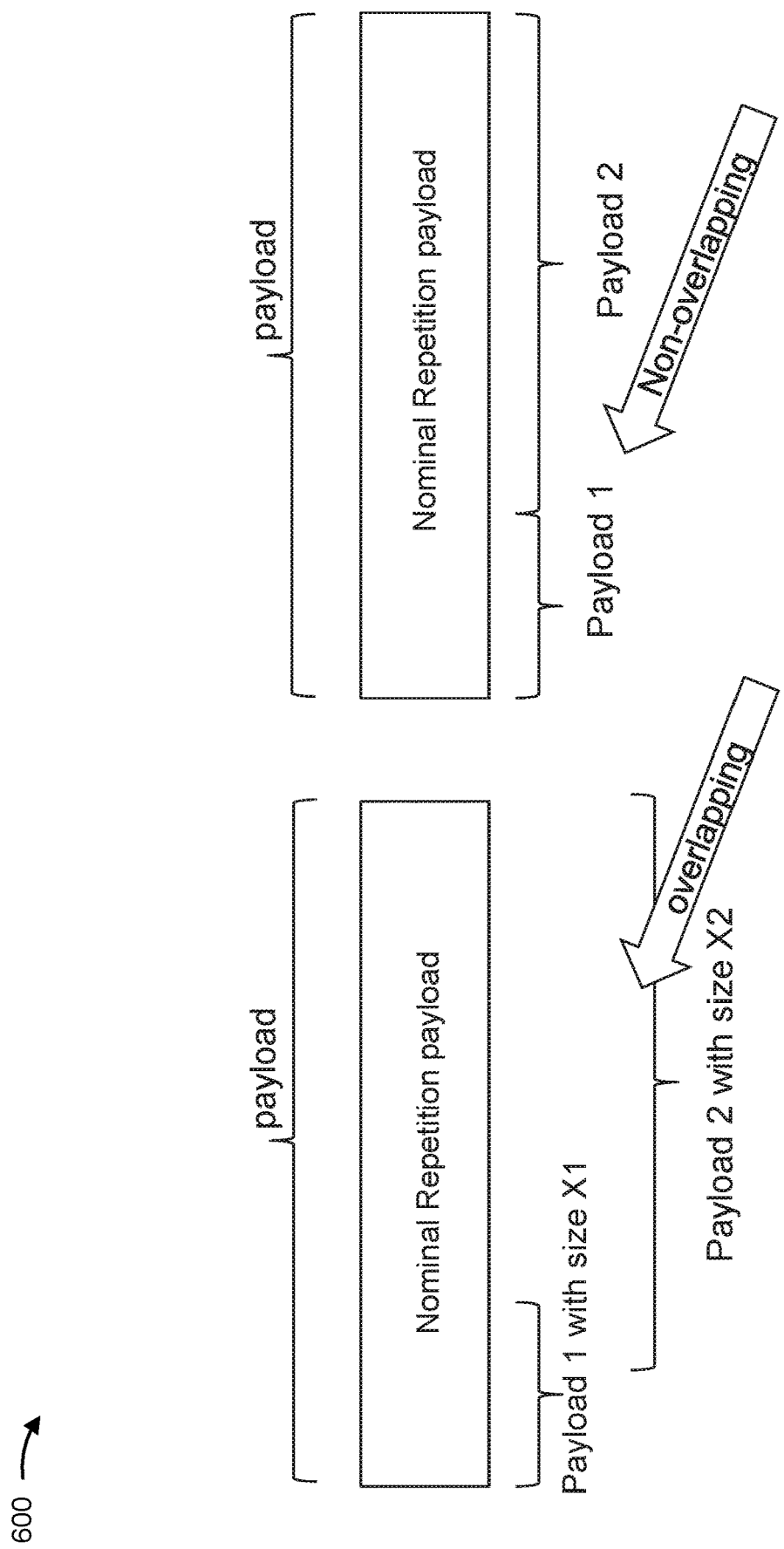
FIG. 6 is a diagram illustrating an example of overlapping and non-overlapping payloads, in accordance with the present disclosure.

FIG. 6 is a diagram illustrating an example 600 of overlapping and non-overlapping payloads, in accordance with the present disclosure.

In some aspects, UE 520 may increase the reliability of some data portions of the transport block by overlapping payloads of repetitions. For example, a first (smaller) repetition may have a first payload of size X1, and a second (smaller) repetition may have a second payload of size X2. The sum of X1 and X2 may exceed the nominal payload size of X. To increase the efficiency and the reliability of the data of the transport block that is transmitted by the repetitions, rather than not using available symbols or not transmitting some data of the transport block, UE 520 May overlap at least a portion of the second payload (Payload 2) with at least a portion of the first payload (Payload 1), as shown in the left figure of example 600. That is, Payload 2 of the second repetition may include at least a portion of Payload 1. A third payload (Payload 3) of a third repetition may include at least a portion of Payload 2 (and may also include at least a portion of Payload 1). By contrast, the right figure of example 600 shows non-overlapping payloads.

Payload 2 may have a fraction a of bits of Payload 1 and y bits from the nominal payload, and thus the Payload 2 size X2 may be $\alpha X1+y$. Payload 3 may have a fraction B of bits of Payload 2 and z bits from the nominal payload, and thus the Payload 3 size X3 may be $\beta X2+z$. Fraction values a and B and other fractions may be fraction factors between 0 and 1 and may be indicated by BS 510 in an RRC message or a MAC CE as tables that are based at least in part on a quantity of symbols of an actual repetition, reliability metrics, or other factors. As a result, the UE 520 may increase the efficiency and the reliability of the data in the repetitions, which may conserve processing resources and signaling resources.

As indicated above, FIG. 6 is provided as an example. Other examples may differ from what is described with regard to FIG. 6.

Figure 7:
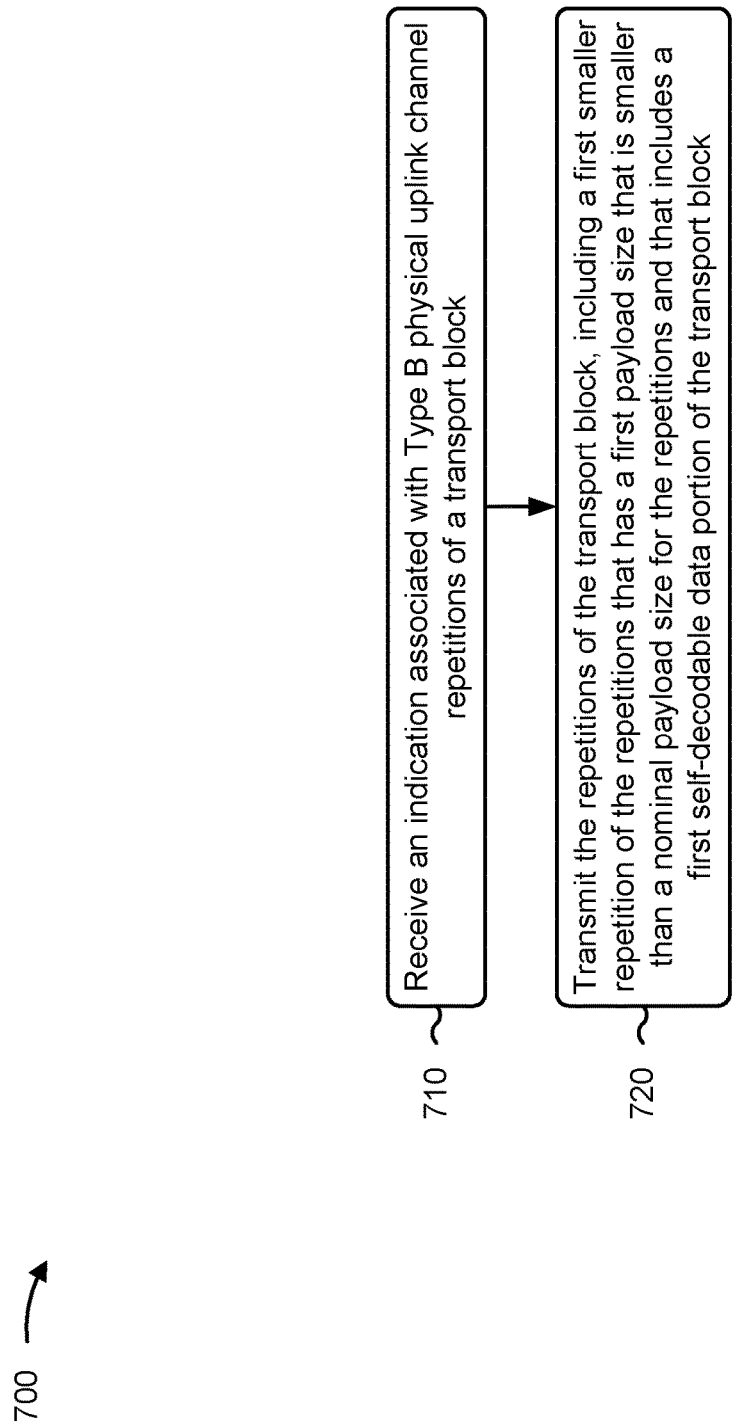
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., a UE 120, UE 520) performs operations associated with transmitting self-decodable data portions in physical uplink repetitions (e.g., PUCCH repetitions, PUSCH repetitions).

As shown in FIG. 7, in some aspects, process 700 may include receiving an indication associated with Type B physical uplink channel repetitions of a transport block (block 710). For example, the UE (e.g., using communication manager 140 and/or reception component 902 depicted in FIG. 9) may receive an indication associated with Type B physical uplink channel repetitions of a transport block, as described above.

As further shown in FIG. 7, in some aspects, process 700 may include transmitting the repetitions of the transport block, including a first smaller repetition of the repetitions that has a first payload size that is smaller than a nominal payload size for the repetitions and that includes a first self-decodable data portion of the transport block (block 720). For example, the UE (e.g., using communication manager 140 and/or transmission component 904 depicted in FIG. 9) may transmit the repetitions of the transport block, including a first smaller repetition of the repetitions that has a first payload size that is smaller than a nominal payload size for the repetitions and that includes a first self-decodable data portion of the transport block, as described above.

Process 700 may include additional aspects, such as any single aspect or any combination of aspects described below and/or in connection with one or more other processes described elsewhere herein.

In a first aspect, the indication indicates a size of the first self-decodable data portion.

In a second aspect, alone or in combination with the first aspect, process 700 includes selecting a size of the first self-decodable data portion based at least in part on stored configuration information and the first payload size of the first smaller repetition.

In a third aspect, alone or in combination with one or more of the first and second aspects, the stored configuration information includes a table that specifies a quantity of bits for a data portion according to actual payload size.

In a fourth aspect, alone or in combination with one or more of the first through third aspects, at least one repetition of the repetitions, before the first smaller repetition, has a payload size equal to the nominal payload size and includes all data for the transport block.

In a fifth aspect, alone or in combination with one or more of the first through fourth aspects, the repetitions include a second smaller repetition that has a second payload size that is smaller than the nominal payload size and that includes a second self-decodable data portion of the transport block, and a sum of the first payload size and the second payload size equate to the nominal payload size.

In a sixth aspect, alone or in combination with one or more of the first through fifth aspects, the repetitions include a second smaller repetition that has a second payload size that is smaller than the nominal payload size and that includes a second self-decodable data portion of the transport block, a sum of the first payload size and the second payload size is less than the nominal payload size, and transmitting the repetitions includes transmitting data of the transport block in the repetitions, except for a last repetition of the repetitions, according to available symbols in each repetition, and transmitting any remaining data of the transport block in the last repetition independently of a quantity of available symbols in the last repetition.

In a seventh aspect, alone or in combination with one or more of the first through sixth aspects, the repetitions include a second smaller repetition that has a second payload size that is smaller than the nominal payload size and that includes a second self-decodable data portion of the transport block, a sum of the first payload size and the second payload size is less than the nominal payload size, and transmitting the repetitions includes transmitting data of the transport block in the repetitions, using the nominal payload size divided among the repetitions, independently of a quantity of available symbols in the repetitions.

In an eighth aspect, alone or in combination with one or more of the first through seventh aspects, transmitting the repetitions includes transmitting the repetitions such that a data portion of a payload of a repetition is included in a payload of another repetition.

In a ninth aspect, alone or in combination with one or more of the first through eighth aspects, the indication indicates an amount of the data portion of the payload of the repetition to include in the payload of the other repetition.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
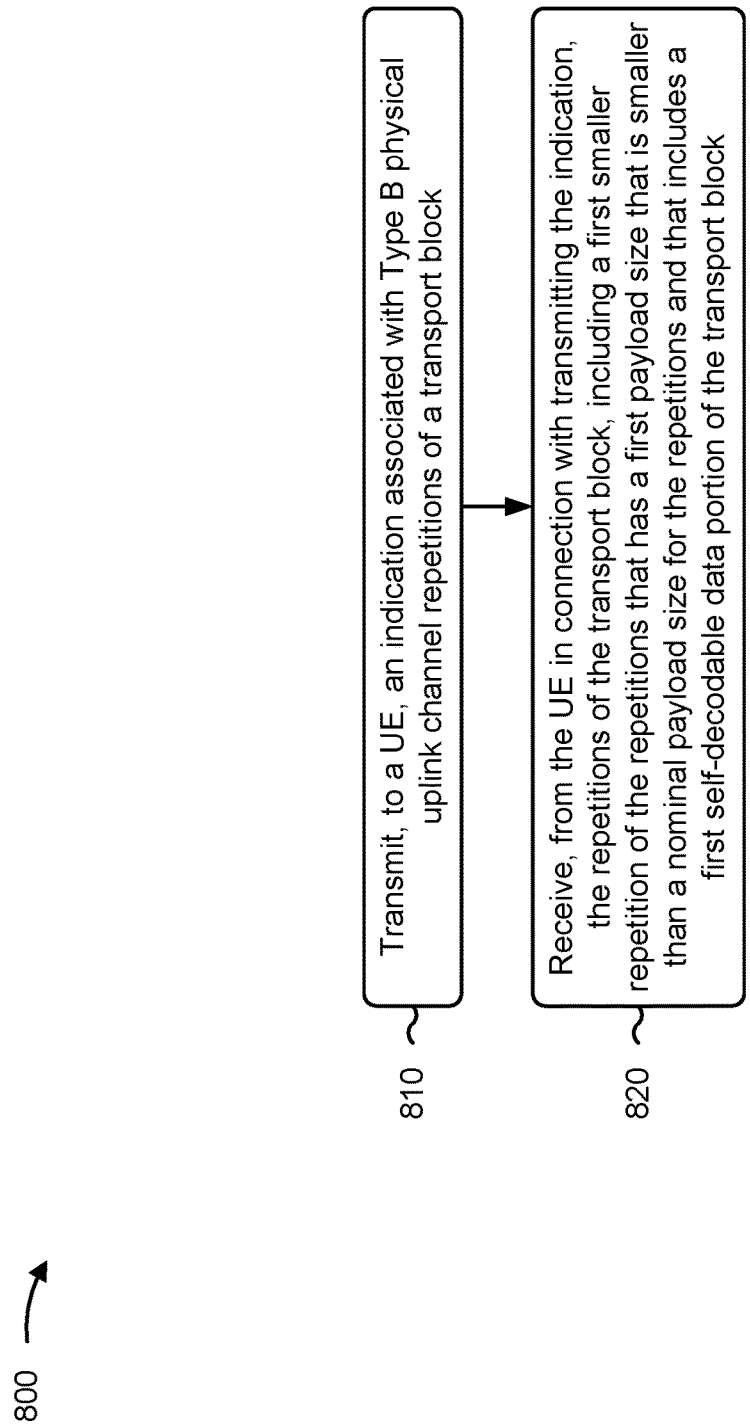
FIG. 8 is a diagram illustrating an example process performed, for example, by a base station, in accordance with the present disclosure.

FIG. 8 is a diagram illustrating an example process 800 performed, for example, by a base station, in accordance with the present disclosure. Example process 800 is an example where the base station (e.g., base station 110, BS 510) performs operations associated with self-decodable data portions for physical uplink repetitions.

As shown in FIG. 8, in some aspects, process 800 may include transmitting, to a UE, an indication associated with Type B physical uplink channel repetitions of a transport block (block 810). For example, the base station (e.g., using communication manager 150 and/or transmission component 1004 depicted in FIG. 10) may transmit, to a UE, an indication associated with Type B physical uplink channel repetitions of a transport block, as described above.

As further shown in FIG. 8, in some aspects, process 800 may include receiving, from the UE in connection with transmitting the indication, the repetitions of the transport block, including a first smaller repetition of the repetitions that has a first payload size that is smaller than a nominal payload size for the repetitions and that includes a first self-decodable data portion of the transport block (block 820). For example, the base station (e.g., using communication manager 150 and/or reception component 1002 depicted in FIG. 10) may receive, from the UE in connection with transmitting the indication, the repetitions of the transport block, including a first smaller repetition of the repetitions that has a first payload size that is smaller than a nominal payload size for the repetitions and that includes a first self-decodable data portion of the transport block, as described above.

Process 800 may include additional aspects, such as any single aspect or any combination of aspects described below and/or in connection with one or more other processes described elsewhere herein.

In a first aspect, the indication indicates a size of the first self-decodable data portion.

In a second aspect, alone or in combination with the first aspect, at least one repetition of the repetitions, before the first smaller repetition, has a payload size equal to the nominal payload size and includes all data for the transport block.

In a third aspect, alone or in combination with one or more of the first and second aspects, the repetitions include a second smaller repetition that has a second payload size that is smaller than the nominal payload size and that includes a second self-decodable data portion of the transport block, and a sum of the first payload size and the second payload size equate to the nominal payload size.

In a fourth aspect, alone or in combination with one or more of the first through third aspects, the repetitions include a second smaller repetition that has a second payload size that is smaller than the nominal payload size and that includes a second self-decodable data portion of the transport block, a sum of the first payload size and the second payload size is less than the nominal payload size, and the indication indicates that the UE is to transmit data of the transport block in the repetitions, except for a last repetition of the repetitions, according to available symbols in each repetition, and transmit any remaining data of the transport block in the last repetition independently of a quantity of available symbols in the last repetition.

In a fifth aspect, alone or in combination with one or more of the first through fourth aspects, the repetitions include a second smaller repetition that has a second payload size that is smaller than the nominal payload size and that includes a second self-decodable data portion of the transport block, a sum of the first payload size and the second payload size is less than the nominal payload size, and the indication indicates that the UE is to transmit data of the transport block in the repetitions, using the nominal payload size divided among the repetitions, independently of a quantity of available symbols in the repetitions.

In a sixth aspect, alone or in combination with one or more of the first through fifth aspects, process 800 includes using the first self-decodable data portion as known bits when decoding data in a payload of another repetition of the repetitions.

In a seventh aspect, alone or in combination with one or more of the first through sixth aspects, receiving the repetitions includes receiving a data portion of a payload of a repetition in a payload of another repetition.

In an eighth aspect, alone or in combination with one or more of the first through seventh aspects, the indication indicates an amount of the data portion of the payload of the repetition to include in the payload of the other repetition.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
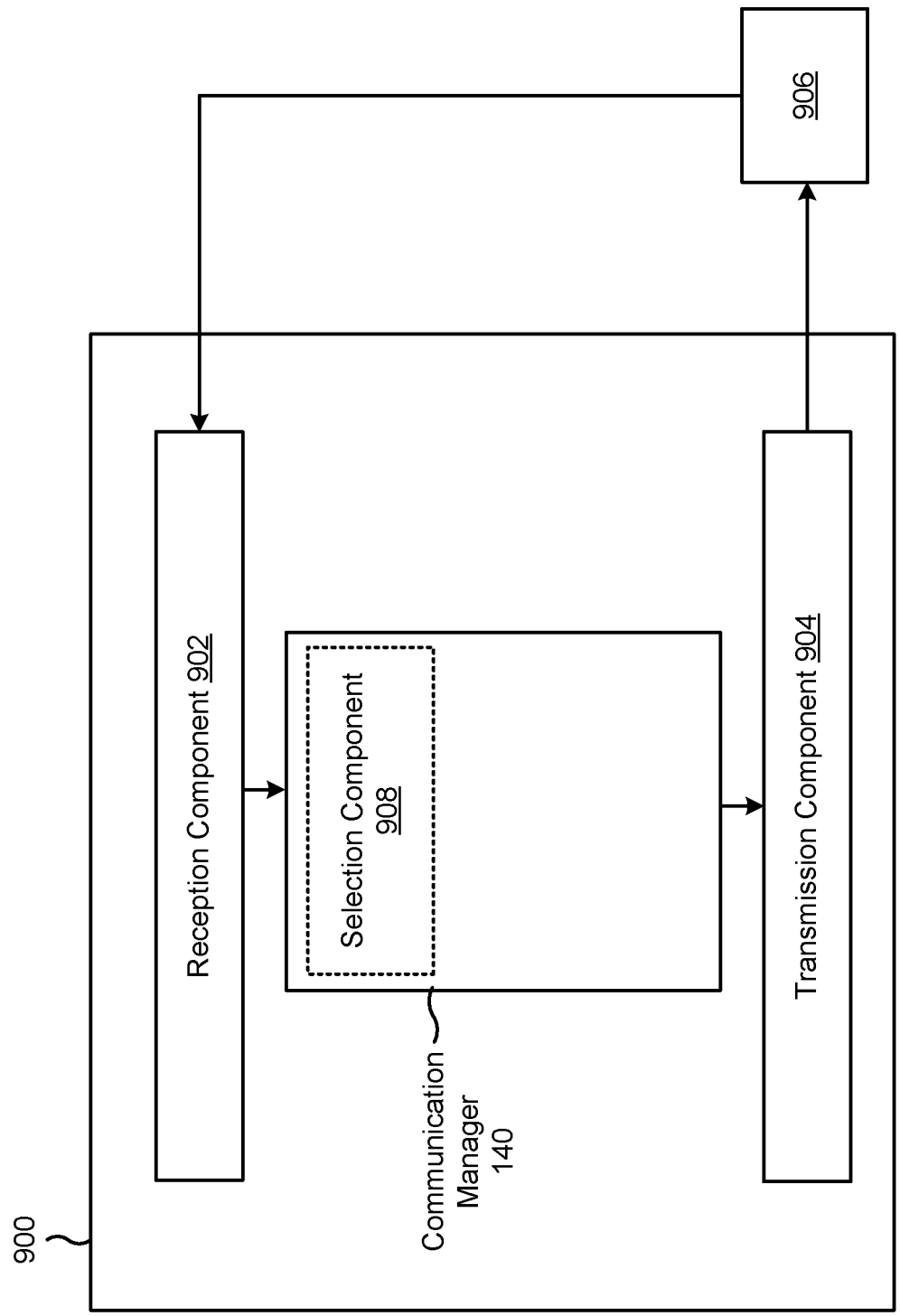
FIGS. 9-10 are diagrams of example apparatuses for wireless communication, in accordance with the present disclosure.

FIG. 9 is a diagram of an example apparatus 900 for wireless communication. The apparatus 900 may be a UE (e.g., UE 120, UE 520), or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a selection component 908, among other examples.

In some aspects, the apparatus 900 may be configured to perform one or more operations described herein in connection with FIGS. 1-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive an indication associated with Type B physical uplink channel repetitions of a transport block. The transmission component 904 may transmit the repetitions of the transport block, including a first smaller repetition of the repetitions that has a first payload size that is smaller than a nominal payload size for the repetitions and that includes a first self-decodable data portion of the transport block.

The selection component 908 may select a size of the first self-decodable data portion based at least in part on stored configuration information and the first payload size of the first smaller repetition.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
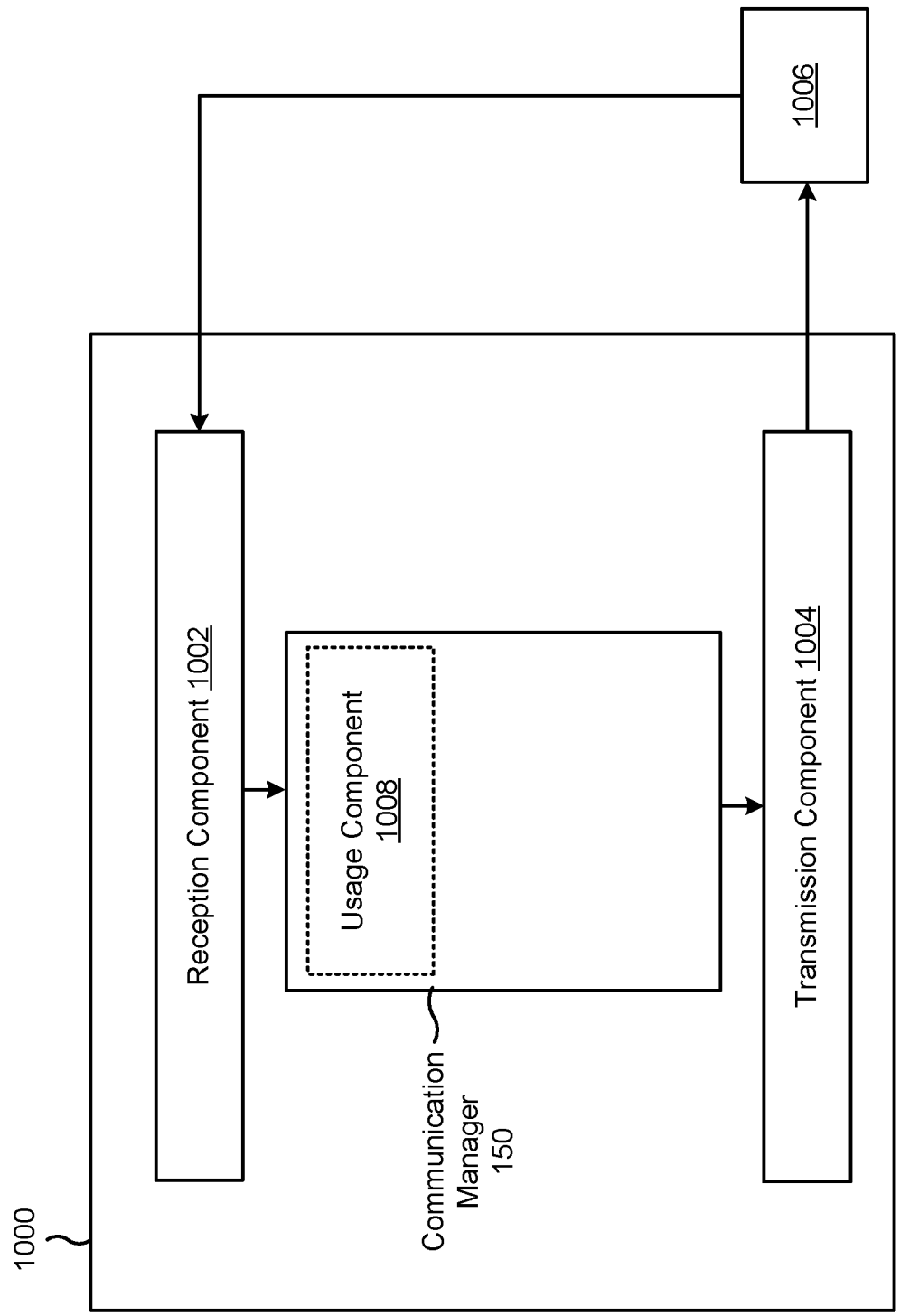

FIG. 10 is a diagram of an example apparatus 1000 for wireless communication. The apparatus 1000 may be a base station (e.g., base station 110, BS 510), or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a usage component 1008, among other examples.

In some aspects, the apparatus 1000 may be configured to perform one or more operations described herein in connection with FIGS. 1-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The transmission component 1004 may transmit, to a UE, an indication associated with Type B physical uplink channel repetitions of a transport block. The reception component 1002 may receive, from the UE in connection with transmitting the indication, the repetitions of the transport block, including a first smaller repetition of the repetitions that has a first payload size that is smaller than a nominal payload size for the repetitions and that includes a first self-decodable data portion of the transport block.

The usage component 1008 may use the first self-decodable data portion as known bits when decoding data in a payload of another repetition of the repetitions.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving an indication associated with Type B physical uplink channel repetitions of a transport block; and transmitting the repetitions of the transport block, including a first smaller repetition of the repetitions that has a first payload size that is smaller than a nominal payload size for the repetitions and that includes a first self-decodable data portion of the transport block.

Aspect 2: The method of Aspect 1, wherein the indication indicates a size of the first self-decodable data portion.

Aspect 3: The method of Aspect 1 or 2, further comprising selecting a size of the first self-decodable data portion based at least in part on stored configuration information and the first payload size of the first smaller repetition.

Aspect 4: The method of Aspect 3, wherein the stored configuration information includes a table that specifies a quantity of bits for a data portion according to actual payload size.

Aspect 5: The method of any of Aspects 1-4, wherein at least one repetition of the repetitions, before the first smaller repetition, has a payload size equal to the nominal payload size and includes all data for the transport block.

Aspect 6: The method of any of Aspects 1-5, wherein the repetitions include a second smaller repetition that has a second payload size that is smaller than the nominal payload size and that includes a second self-decodable data portion of the transport block, and wherein a sum of the first payload size and the second payload size equate to the nominal payload size.

Aspect 7: The method of any of Aspects 1-5, wherein the repetitions include a second smaller repetition that has a second payload size that is smaller than the nominal payload size and that includes a second self-decodable data portion of the transport block, wherein a sum of the first payload size and the second payload size is less than the nominal payload size, and wherein transmitting the repetitions includes: transmitting data of the transport block in the repetitions, except for a last repetition of the repetitions, according to available symbols in each repetition; and transmitting any remaining data of the transport block in the last repetition independently of a quantity of available symbols in the last repetition.

Aspect 8: The method of any of Aspects 1-5, wherein the repetitions include a second smaller repetition that has a second payload size that is smaller than the nominal payload size and that includes a second self-decodable data portion of the transport block, wherein a sum of the first payload size and the second payload size is less than the nominal payload size, and wherein transmitting the repetitions includes transmitting data of the transport block in the repetitions, using the nominal payload size divided among the repetitions, independently of a quantity of available symbols in the repetitions.

Aspect 9: The method of any of Aspects 1-8, wherein transmitting the repetitions includes transmitting the repetitions such that a data portion of a payload of a repetition is included in a payload of another repetition.

Aspect 10: The method of Aspect 9, wherein the indication indicates an amount of the data portion of the payload of the repetition to include in the payload of the other repetition.

Aspect 11: A method of wireless communication performed by a base station, comprising: transmitting, to a user equipment (UE), an indication associated with Type B physical uplink channel repetitions of a transport block; and receiving, from the UE in connection with transmitting the indication, the repetitions of the transport block, including a first smaller repetition of the repetitions that has a first payload size that is smaller than a nominal payload size for the repetitions and that includes a first self-decodable data portion of the transport block.

Aspect 12: The method of Aspect 11, wherein the indication indicates a size of the first self-decodable data portion.

Aspect 13: The method of Aspect 11 or 12, wherein at least one repetition of the repetitions, before the first smaller repetition, has a payload size equal to the nominal payload size and includes all data for the transport block.

Aspect 14: The method of any of Aspects 11-13, wherein the repetitions include a second smaller repetition that has a second payload size that is smaller than the nominal payload size and that includes a second self-decodable data portion of the transport block, and wherein a sum of the first payload size and the second payload size equate to the nominal payload size.

Aspect 15: The method of any of Aspects 11-13, wherein the repetitions include a second smaller repetition that has a second payload size that is smaller than the nominal payload size and that includes a second self-decodable data portion of the transport block, wherein a sum of the first payload size and the second payload size is less than the nominal payload size, and wherein the indication indicates that the UE is to: transmit data of the transport block in the repetitions, except for a last repetition of the repetitions, according to available symbols in each repetition; and transmit any remaining data of the transport block in the last repetition independently of a quantity of available symbols in the last repetition.

Aspect 16: The method of any of Aspects 11-13, wherein the repetitions include a second smaller repetition that has a second payload size that is smaller than the nominal payload size and that includes a second self-decodable data portion of the transport block, wherein a sum of the first payload size and the second payload size is less than the nominal payload size, and wherein the indication indicates that the UE is to transmit data of the transport block in the repetitions, using the nominal payload size divided among the repetitions, independently of a quantity of available symbols in the repetitions.

Aspect 17: The method of any of Aspects 11-16, further comprising using the first self-decodable data portion as known bits when decoding data in a payload of another repetition of the repetitions.

Aspect 18: The method of any of Aspects 11-17, wherein receiving the repetitions includes receiving a data portion of a payload of a repetition in a payload of another repetition.

Aspect 19: The method of Aspect 18, wherein the indication indicates an amount of the data portion of the payload of the repetition to include in the payload of the other repetition.

Aspect 20: An apparatus for wireless communication at a device, comprising a processor; memory coupled with the processor; and instructions stored in the memory and executable by the processor to cause the apparatus to perform the method of one or more of Aspects 1-19.

Aspect 21: A device for wireless communication, comprising a memory and one or more processors coupled to the memory, the one or more processors configured to perform the method of one or more of Aspects 1-19.

Aspect 22: An apparatus for wireless communication, comprising at least one means for performing the method of one or more of Aspects 1-19.

Aspect 23: A non-transitory computer-readable medium storing code for wireless communication, the code comprising instructions executable by a processor to perform the method of one or more of Aspects 1-19.

Aspect 24: A non-transitory computer-readable medium storing a set of instructions for wireless communication, the set of instructions comprising one or more instructions that, when executed by one or more processors of a device, cause the device to perform the method of one or more of Aspects 1-19.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a +c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      receive an indication associated with Type B physical uplink channel repetitions of a transport block; and
      transmit the repetitions, including a first smaller repetition of the repetitions that has a first payload size that is smaller than a nominal payload size for the repetitions and that includes a first self-decodable data portion of the transport block, wherein the first self-decodable data portion is independently decodable, and wherein the repetitions include a second smaller repetition that has a second payload size that is smaller than the nominal payload size and that includes a second self-decodable data portion of the transport block.

2. The UE of claim 1, wherein the indication indicates a size of the first self-decodable data portion.

3. The UE of claim 1, wherein the one or more processors are configured to select a size of the first self-decodable data portion based at least in part on stored configuration information and the first payload size of the first smaller repetition.

4. The UE of claim 3, wherein the stored configuration information includes a table that specifies a quantity of bits for a data portion according to actual payload size.

5. The UE of claim 1, wherein at least one repetition of the repetitions, before the first smaller repetition, has a payload size equal to the nominal payload size and includes all data for the transport block.

6. The UE of claim 1, wherein a sum of the first payload size and the second payload size equate to the nominal payload size.

7. The UE of claim 1, wherein a sum of the first payload size and the second payload size is less than the nominal payload size, and wherein the one or more processors, to transmit the repetitions, are configured to:
transmit data of the transport block in the repetitions, except for a last repetition of the repetitions, according to available symbols in each repetition of the repetitions; and
transmit any remaining data of the transport block in the last repetition independently of a quantity of available symbols in the last repetition.

8. The UE of claim 1, wherein a sum of the first payload size and the second payload size is less than the nominal payload size, and wherein the one or more processors, to transmit the repetitions, are configured to transmit data of the transport block in the repetitions, using the nominal payload size divided among the repetitions, independently of a quantity of available symbols in the repetitions.

9. The UE of claim 1, wherein the one or more processors, to transmit the repetitions, are configured to transmit the repetitions such that a data portion of a payload of a repetition is included in a payload of another repetition.

10. The UE of claim 9, wherein the indication indicates an amount of the data portion of the payload of the repetition to include in the payload of the other repetition.

11. A base station for wireless communication, comprising:
one or more memories; and
one or more processors, coupled to the one or more memories, configured to:
transmit, to a user equipment (UE), an indication associated with Type B physical uplink channel repetitions of a transport block; and
receive, from the UE in connection with transmitting the indication, the repetitions, including a first smaller repetition of the repetitions that has a first payload size that is smaller than a nominal payload size for the repetitions and that includes a first self-decodable data portion of the transport block, wherein the first self-decodable data portion is independently decodable, and wherein the repetitions include a second smaller repetition that has a second payload size that is smaller than the nominal payload size and that includes a second self-decodable data portion of the transport block.

12. The base station of claim 11, wherein the indication indicates a size of the first self-decodable data portion.

13. The base station of claim 11, wherein at least one repetition of the repetitions, before the first smaller repetition, has a payload size equal to the nominal payload size and includes all data for the transport block.

14. The base station of claim 11, wherein a sum of the first payload size and the second payload size equate to the nominal payload size.

15. The base station of claim 11, wherein a sum of the first payload size and the second payload size is less than the nominal payload size, and wherein the indication indicates that the UE is to:
transmit data of the transport block in the repetitions, except for a last repetition of the repetitions, according to available symbols in each repetition of the repetitions; and
transmit any remaining data of the transport block in the last repetition independently of a quantity of available symbols in the last repetition.

16. The base station of claim 11, wherein a sum of the first payload size and the second payload size is less than the nominal payload size, and wherein the indication indicates that the UE is to transmit data of the transport block in the repetitions, using the nominal payload size divided among the repetitions, independently of a quantity of available symbols in the repetitions.

17. The base station of claim 11, wherein the one or more processors are configured to use the first self-decodable data portion as known bits when decoding data in a payload of another repetition of the repetitions.

18. The base station of claim 11, wherein the one or more processors, to receive the repetitions, are configured to receive a data portion of a payload of a repetition in a payload of another repetition.

19. The base station of claim 18, wherein the indication indicates an amount of the data portion of the payload of the repetition to include in the payload of the other repetition.

20. A method of wireless communication performed by a user equipment (UE), comprising:
receiving an indication associated with Type B physical uplink channel repetitions of a transport block; and
transmitting the repetitions, including a first smaller repetition of the repetitions that has a first payload size that is smaller than a nominal payload size for the repetitions and that includes a first self-decodable data portion of the transport block, wherein the first self-decodable data portion is independently decodable, and wherein the repetitions include a second smaller repetition that has a second payload size that is smaller than the nominal payload size and that includes a second self-decodable data portion of the transport block.

21. The method of claim 20, further comprising selecting a size of the first self-decodable data portion based at least in part on stored configuration information and the first payload size of the first smaller repetition.

22. The method of claim 20, wherein a sum of the first payload size and the second payload size equate to the nominal payload size.

23. The method of claim 20, wherein a sum of the first payload size and the second payload size is less than the nominal payload size, and wherein transmitting the repetitions includes:
transmitting data of the transport block in the repetitions, except for a last repetition of the repetitions, according to available symbols in each repetition of the repetitions; and
transmitting any remaining data of the transport block in the last repetition independently of a quantity of available symbols in the last repetition.

24. The method of claim 20, wherein a sum of the first payload size and the second payload size is less than the nominal payload size, and wherein transmitting the repetitions includes transmitting data of the transport block in the repetitions, using the nominal payload size divided among the repetitions, independently of a quantity of available symbols in the repetitions.

25. The method of claim 20, wherein transmitting the repetitions includes transmitting the repetitions such that a data portion of a payload of a repetition is included in a payload of another repetition.

26. A method of wireless communication performed by a base station, comprising:

transmitting, to a user equipment (UE), an indication associated with Type B physical uplink channel repetitions of a transport block; and receiving, from the UE in connection with transmitting the indication, the repetitions, including a first smaller repetition of the repetitions that has a first payload size that is smaller than a nominal payload size for the repetitions and that includes a first self-decodable data portion of the transport block, wherein the first self-decodable data portion is independently decodable, and wherein the repetitions include a second smaller repetition that has a second payload size that is smaller than the nominal payload size and that includes a second self-decodable data portion of the transport block.

27. The method of claim 26, wherein at least one repetition of the repetitions, before the first smaller repetition, has a payload size equal to the nominal payload size and includes all data for the transport block.

28. The method of claim 26, wherein a sum of the first payload size and the second payload size equate to the nominal payload size.

29. The method of claim 26, wherein a sum of the first payload size and the second payload size is less than the nominal payload size, and wherein the indication indicates that the UE is to:

transmit data of the transport block in the repetitions, except for a last repetition of the repetitions, according to available symbols in each repetition of the repetitions; and transmit any remaining data of the transport block in the last repetition independently of a quantity of available symbols in the last repetition.

30. The method of claim 26, wherein a sum of the first payload size and the second payload size is less than the nominal payload size, and wherein the indication indicates that the UE is to transmit data of the transport block in the repetitions, using the nominal payload size divided among the repetitions, independently of a quantity of available symbols in the repetitions.

* * * * *